(12) United States Patent
Takahashi

(10) Patent No.: US 6,358,456 B1
(45) Date of Patent: Mar. 19, 2002

(54) MOLDING BODY AND FABRICATING METHOD THEREOF

(75) Inventor: Toshiharu Takahashi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/292,736

(22) Filed: Apr. 16, 1999

(30) Foreign Application Priority Data

Apr. 16, 1998 (JP) ............................................. 10-106555

(51) Int. Cl.[7] ........................ B29C 75/14; B29C 70/74; B29C 70/80
(52) U.S. Cl. ........................ 264/268; 264/273; 264/267; 428/35.7
(58) Field of Search .............................. 264/267, 271.1, 264/273, 274, 275, 279, 268; 425/129.1; 428/66.4, 66.6, 35.7

(56) References Cited

U.S. PATENT DOCUMENTS

| | | | | | |
|---|---|---|---|---|---|
| 3,861,646 | A | * | 1/1975 | Douglas | 264/267 |
| 4,342,799 | A | * | 8/1982 | Schwochert | 264/515 |
| 4,410,479 | A | * | 10/1983 | Cyriax | 264/255 |
| 4,495,740 | A | * | 1/1985 | Sarrazin et al. | 52/309.1 |
| 4,842,540 | A | * | 6/1989 | Endo et al. | 439/271 |
| 5,334,039 | A | * | 8/1994 | Kanda | 264/273 |
| 5,643,521 | A | * | 7/1997 | Nehm | 264/255 |
| 5,683,641 | A | * | 11/1997 | Jaskowiak | 264/267 |
| 5,733,493 | A | * | 3/1998 | Katsuno et al. | 264/255 |
| 5,846,468 | A | * | 12/1998 | Yagi et al. | 264/268 |
| 5,851,472 | A | * | 12/1998 | Kashiyama | 264/268 |
| 5,876,288 | A | * | 3/1999 | Jaskowiak | 464/181 |

* cited by examiner

*Primary Examiner*—Angela Ortiz
(74) *Attorney, Agent, or Firm*—Sughrue Mion, PLLC

(57) ABSTRACT

A secondary molding body in which shrinkage and weld formation is avoided. Resin is molded within an annular molding portion (31) provided at a primary molding body (10) to form a secondary molding body integrally with the primary molding body thereby to form a molding body. The annular molding portion (31) is provided with a gate opening (33) and an overflow opening (34) with two flow paths therebetween. One of the two resin flow paths (31*a* and 31*b*) is set to be longer in the flowing distance and/or flowing resistance than the other of the two flow paths. The overflow opening (34) is arranged in a manner that the distance of the overflow opening (34) facing the one flow path having the larger flowing distance and/or flowing resistance is made longer than the distance thereof facing the other flow path. Thus, the flowing distances and/or flowing resistances of the flow paths (31*a* and 31*b*) flowing toward left and right direction within the annular molding portion (31) are made substantially same, so that the resin flowing through the two flow paths joins at the overflow opening (34) and then flow out of the overflow opening.

8 Claims, 6 Drawing Sheets

MOLDING BODY AND FABRICATING METHOD THEREOF

BACKGROUND OF THE INVENTION

1. Field of the Invention

The present invention relates to a molding body and the fabricating method thereof in which resin is supplied to the annular molding portion of a primary molding body thereby to form a secondary molding body integrally with the primary molding body.

2. Discussion of Related Art

In the case of fabricating a molding body by forming a packing as a secondary molding body integrally with a primary molding body, the molding body is formed in a manner that an annular molding portion is formed on the primary molding body and then fused elastomer is injected in the annular molding portion by using the primary molding body as a drag or female mold.

FIGS. 8 to 11 are diagrams showing the conventional method of fabricating such a molding body. An annular molding portion 2, shown in FIGS. 10 and 11, is formed on the bottom surface of a primary molding body 1. The annular molding portion 2 is formed in such a manner that erected wall portions 3 are provided in an opposed state on the bottom surface of the primary molding body 1 to form the annular molding portion 2 between the erected wall portions 3. The annular molding portion 2 is provided with a gate opening (not shown) for injecting the fused elastomer (fused resin) within the annular molding portion 2 and is also provided with an overflow opening 4 for allowing the fused resin to flow out of the annular molding portion. The overflow opening 4 is located on the opposite side of the gate opening so that the tip end portion of the fused resin injected into the annular molding portion from the gate opening flows out through the overflow opening so that the fused resin is filled entirely within the annular molding portion 2.

In the case of forming such a molding body 8, the bottom surface of the primary molding body 1 is brought into contact with a die or metal mold and the fused resin is injected through the gate opening into the annular molding portion 2. The injected fused resin 6 is divided into two flow paths within the annular molding portion 2, one flowing in the left direction from the gate and the other flowing in the right direction from the gate. Then, as shown by arrows 6 in FIG. 10, the two paths of resin join at the overflow opening 4 from the left and right direction. Thereafter, the tip portion of the fused resin flows out from the overflow opening 4. Once the resin has flowed out through the opening 4, it is determined that the annular molding portion 2 has been filled entirely with the fused resin. Thereafter, the fused resin is cooled so that the elastomer with elasticity is formed.

In FIG. 11, a reference numeral 7 depicts an elastomer serving as a secondary molding body formed in the annular molding portion 2. When the elastomer 7 is integrally formed with the annular molding portion 2 in this manner, the fabrication of the molding body 8 is completed. After the fabrication of the mold body as described above, the resin that overflowed through the opening 4 is cut and removed.

FIG. 9 is a diagram showing the state where the molding body 8 fabricated in this manner is attached to a unit or device 5. When the molding body 8 and the unit 5 are pressed to each other, the elastomer 7 closely contacts the unit 5, so that the elastomer 7 serves as a packing for establishing a seal between the molding body 8 and the unit 5.

According to such a molding method, in order to ensure a proper seal, the overflow opening 4 cannot be formed so that it is flush with the bottom surface of the primary molding body 1. Thus, a gas pocket is likely generated at the time of molding the fused resin, so that the fused resin cannot flow smoothly within the annular molding portion 2 due to the presence of the gas pocket. Further, when the length of the two flow paths from the injection gate to the overflow opening 4 differ from each other, the two flowpaths will merge together at a location that is displaced from the overflow opening 4. As a result, the resin 6 flowing through the two paths cannot flow smoothly through the overflow opening 4. If such a phenomenon occurs, shrinkage of the resin 7 results and welds are generated, so that the intensity of the drawing tension of the secondary molding body is degraded. As a result, the secondary molding body is likely to be cut. Further, as shown by a circle 9 in FIG. 11, there arises a problem that the close adherence between the erected wall portions 3 and the elastomer 7 can not be achieved.

SUMMARY OF THE INVENTION

Accordingly, an object of the present invention is to provide a molding body and a fabricating method thereof in which the secondary molding body, which is integrally formed with a primary molding body, does not experience shrinkage or the generation of welds. Another object is to ensure that the leading end of the resin flows through an overflow opening so that the secondary molding body is completely formed.

In order to achieve the aforesaid objects, the molding body of the present invention is characterized in that resin is molded within an annular molding portion provided on a primary molding body to form a secondary molding body integrally with the primary molding body. According to the invention, the annular molding portion is provided with a gate opening and an overflow opening and defining two flow paths therebetween. One of the paths is set to have a larger flowing distance and/or resistance than the other flow path, and the overflow opening is arranged in a manner that a length of the overflow opening facing the flow path having the larger flowing distance and/or flowing resistance is made larger than a length thereof facing on the other flow path.

In the present invention, since the overflow opening is arranged in this manner, the resin of the two flow paths can surely join at the overflow opening and then flow out of the overflow opening even when the flowing distances and/or flowing resistances of the two flow paths of the resin differ from each other. Thus, shrinkage of the resin and generation of welds in the resin are avoided. Thus, the intensity of the drawing tension is not reduced. Further, since a gas pocket is prevented from being generated, it is not necessary to lower the overflow opening to the bottom surface of the primary molding portion in order to prevent the generation of the gas pocket, so the resin can surely perform the sealing property.

According to the invention, the secondary molding body is made of elastomer. Therefore, when the elastomer has been molded, the resulting secondary molding body is elastic, so that the secondary molding body can function as a seal with the unit or the like.

The method of fabricating a molding body is further characterized in that the molding body is formed in a manner that flowing distances and/or flowing resistances of two flow paths of the resin from the gate opening to the overflow opening are adjusted to be substantially the same. Therefore, the resin of the two flow paths can surely join at the overflow opening and then flow out through the overflow opening. Therefore, the molding can be performed without generating shrinkage and welds in the resin.

DETAILED DESCRIPTION OF THE INVENTION

Figure 1:
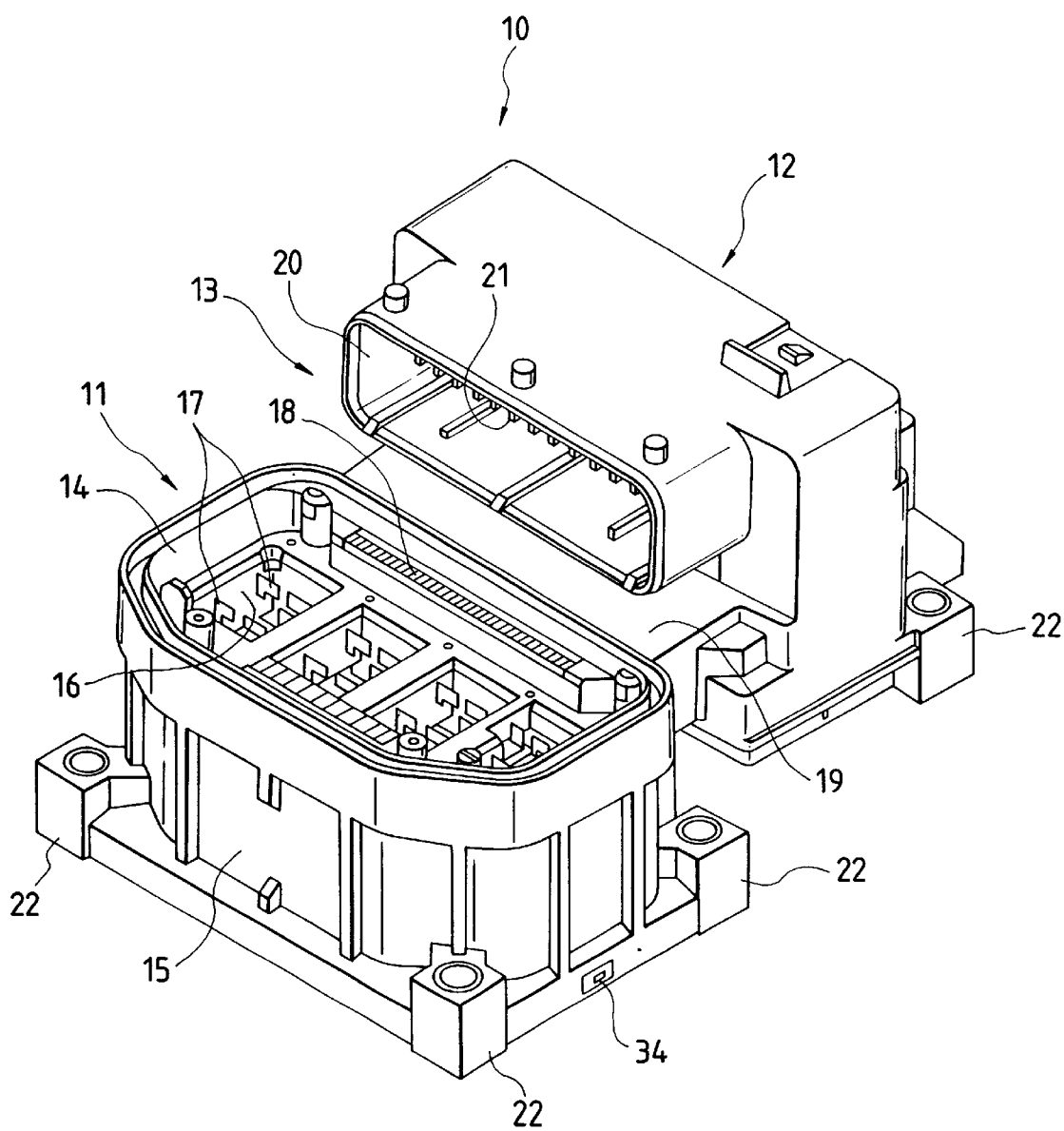
FIG. 1 is a perspective view of a built-in connector type casing serving as a primary molding body according to an embodiment of the present invention.
Figure 2:
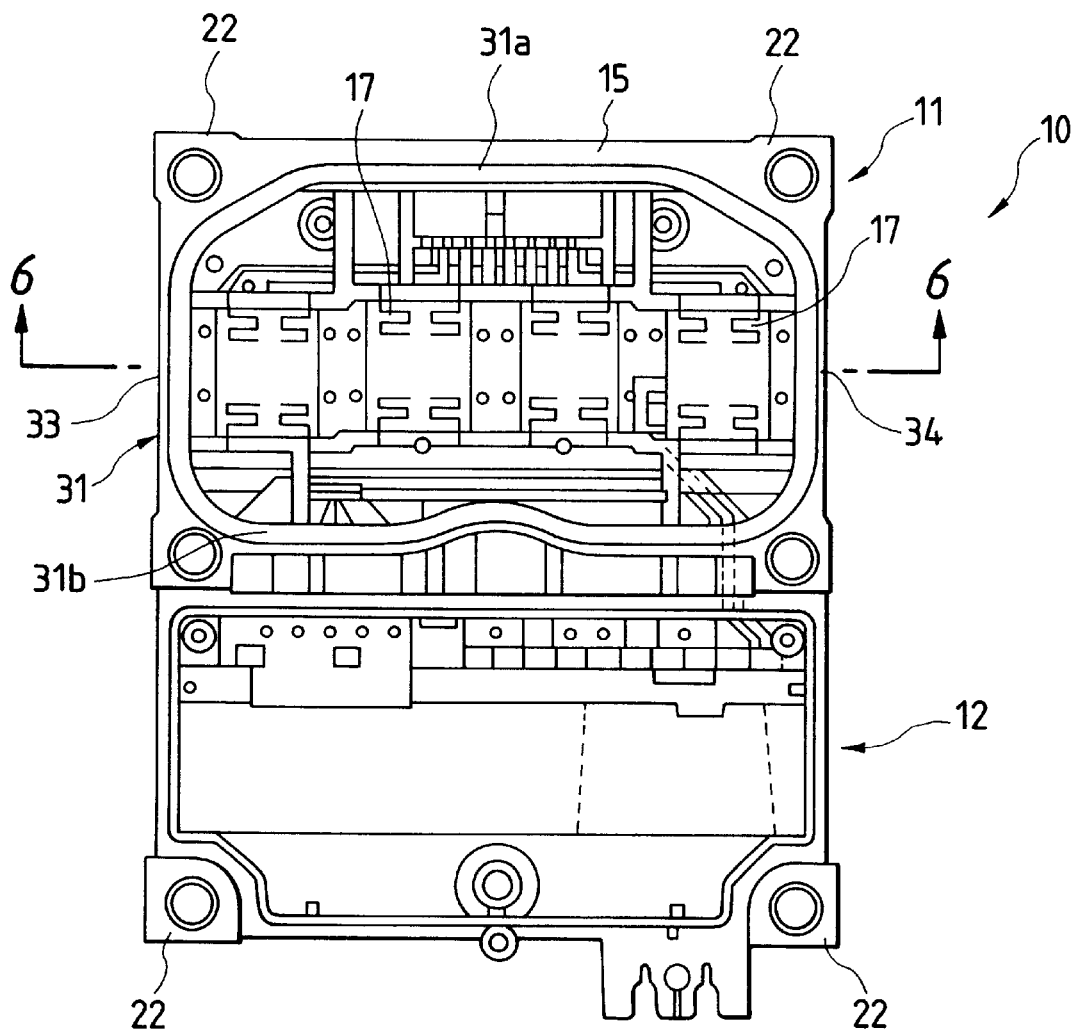
FIG. 2 is a bottom plan view of the built-in connector type casing.
Figure 3:
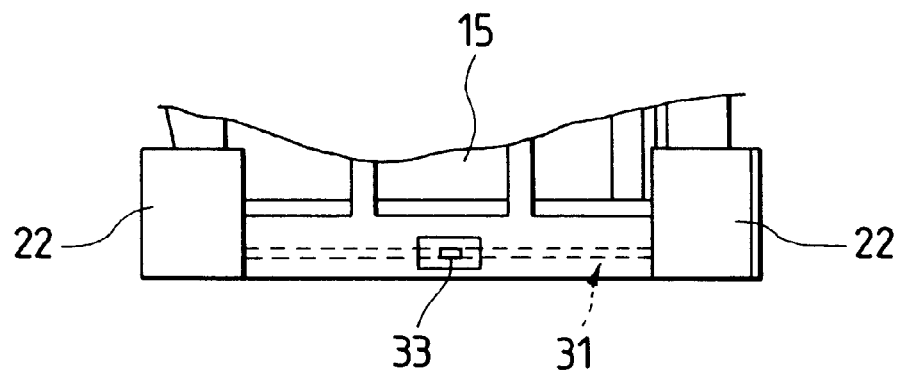
FIG. 3 is a front view of a gate opening provided at an annular molding portion.
Figure 4:
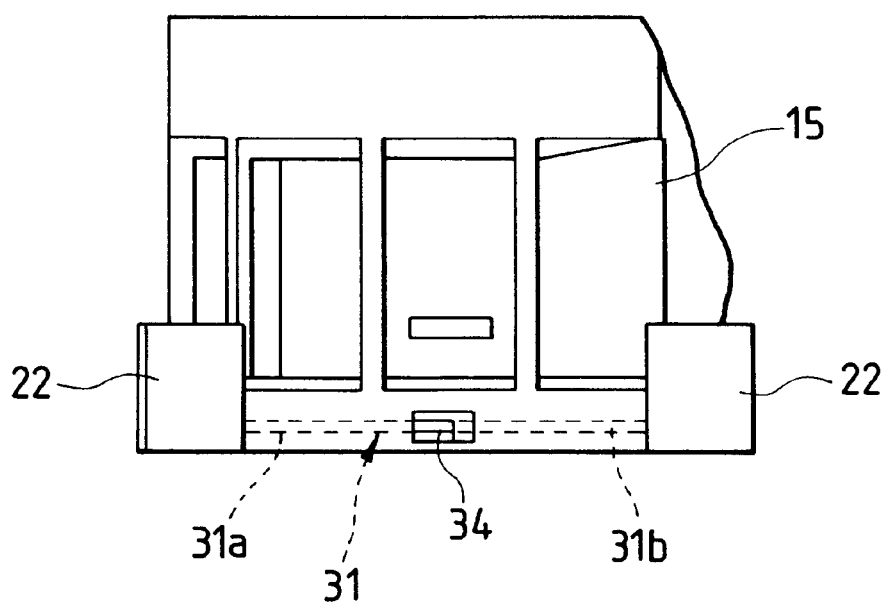
FIG. 4 is a front view of an overflow opening provided at the annular molding portion.

The present invention will be explained concretely with reference to FIGS. 1 to 7. FIG. 1 is a perspective view of a primary molding body according to an embodiment of the present invention, FIG. 2 is a bottom plan view thereof, and FIGS. 3 and 4 are diagrams showing a gate opening and an overflow opening, respectively.

The primary molding body according to the embodiment of the present invention is a built-in connector type casing 10 which includes a main body 13 having a substrate attachment portion 11 and a connector portion 12. A lid body (not shown) covers the substrate attachment portion 11 of the main body 13.

The substrate attachment portion 11 includes a hood portion 14, over which the lid body is placed and to which a substrate (not shown), such as a printed circuit board, is attached, and a cylindrical portion 15 integrally and continuously provided at the lower portion of the hood portion 14. A plurality of recess portions 16 are formed within the hood portion 14 and projection terminals 17 are disposed within the recess portions 16. A portion of a bus bar is formed within the hood portion 14 and is exposed in a linear manner to form terminal portion 18. The bus bar is insert molded in the substrate attachment portion 11 and the connector portion 12 when they are formed. The terminal portion 18 is connected by means of a wire bonding to a pattern formed on a substrate which is attached to the substrate attachment portion 11.

The connector portion 12 is integrally formed with the substrate attachment portion 11 so as to extend from the side wall on the rear of the substrate attachment portion 11. The connector portion 12 is coupled with the substrate attachment portion 11 by means of an interconnection portion 19 provided therebetween. When a partner side connector (not shown) is fitted into the connector portion 12, the connector portion is electrically connected with the partner side connector. In order to perform such an electrical connection, the connector portion 12 is provided with a cylindrical connector insertion opening 20 directed to the substrate attachment portion 11 side into which the partner side connector fits. A plurality of contact terminals 21, serving as one terminal of the bus bar, are disposed within the connector insertion opening 20.

Such a built-in connector type casing 10 is fixed to a panel of an automobile (not shown) in a state that the elastomer, serving as a secondary molding body, is molded as described later. In order to fix the built-in connector type casing to the panel, fixing portions 22 to be fixed to the panel are integrally formed on the cylindrical portion 15 of the substrate attachment portion 11 and on the connector portion 12.

Figure 5:
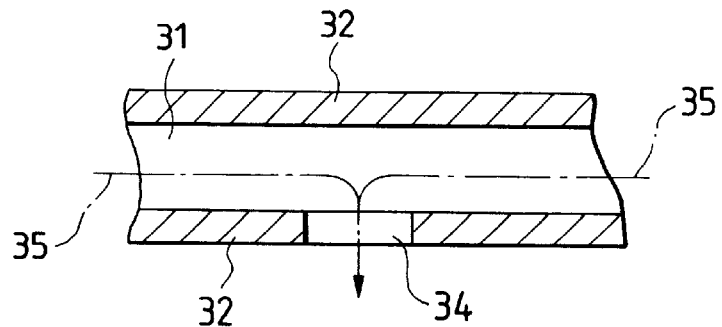
FIG. 5 is a sectional view of the annular molding portion showing the flow of resin.
Figure 6:
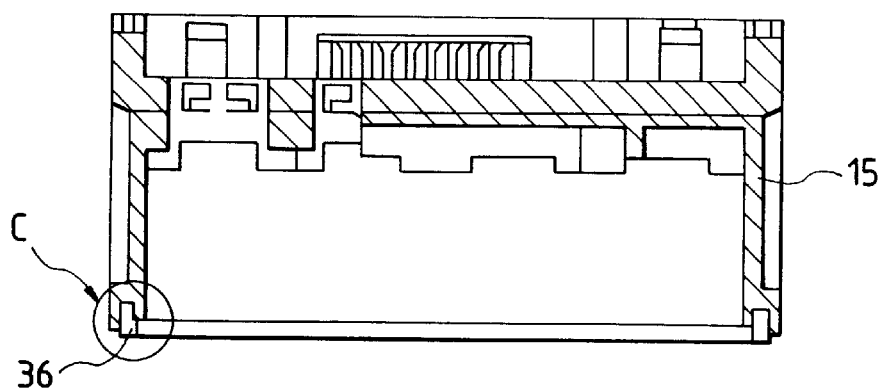
FIG. 6 is a sectional view of the built-in connector type casing taken along a line 6—6 in FIG. 2.
Figure 7:
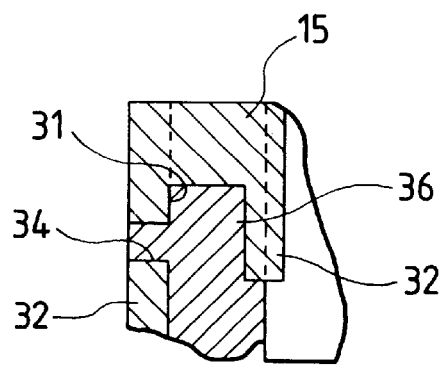
FIG. 7 is an enlarged sectional view of a portion C in FIG. 6.
Figure 8:
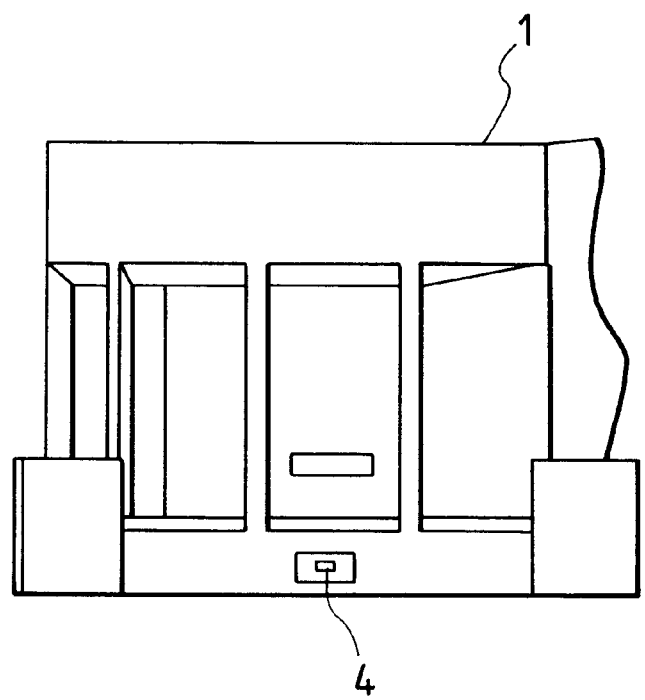
FIG. 8 is a front view of an overflow opening of a conventional annular molding portion.

As shown in FIG. 2, the projection terminals 17, provided in the hood portion 14, are exposed on the bottom side of the casing 10. In order to electrically insulate the exposed portions of the projection terminals 17, the cylindrical portion 15 is provided with an annular molding portion 31 for surrounding the exposed portions of the projection terminals 17. The annular molding portion 31 is formed by providing erected wall portions 32, 32 on the bottom surface of the cylindrical portion 15 so as to be opposed to each other, as shown in FIG. 5. The lower end surface of the annular molding portion 31 is opened as shown in FIGS. 6 and 7.

According to one embodiment, fused resin is supplied within the annular molding portion 31 and molded thereby to form the secondary molding body serving as a packing which is integral with the primary molding body 10. In order to supply the fused resin to the annular molding portion 31, a gate opening 33 for injecting the fused resin within the annular molding portion is provided at the one end side of the annular molding portion 31. Further, an overflow opening 34 is provided at the opposite side of the gate opening 33. The resin may be one having elasticity around the room temperature, and so resin such as synthetic rubber, polyisobutylene, polyethylene or the like may be employed as the resin.

The molding operation for forming the secondary molding body can be performed in a manner that the built-in connector type casing 10, serving as the primary molding body mold, contacts a female mold (not shown). That is, first, the bottom surface of the cylindrical portion 15 of the casing is brought into close contact with the female mold. In this state, the resin 35 is injected through the gate opening 33 within the annular molding portion 31. The injected resin 35 is then divided into two flow paths, one flowing to the left in the annular molding portion 31 and one flowing to the right. Then, as shown in FIG. 5, the flowpaths of the fused resin are joined at the overflow opening 34, whereupon the fused resin flows out through the overflow opening 34. When the resin is molded in this manner, the fused resin 35 fills the annular molding portion 31 so as to form an elastomer (secondary molding body) 36 having elasticity, which can serve as a packing.

According to the invention, the flowing distances and/or flowing resistances of the two flow paths from the gate opening 33 to the overflow opening 34 are adjusted to be substantially the same. In this particular embodiment, as shown in FIG. 2, one flow path 31a of the two flow paths is set to be longer than the other flow path 31b. However, referring to FIG. 4, the overflow opening 34 is arranged to shift a side of the flow path 31a in such a manner that an opening of the overflow opening 34 opens toward the flow path 31a. As a consequence, the distances of the two flow paths 31a and 31b within the annular molding portion 31 are made substantially same, so that the fused resin 35 flowing in the flow paths are surely joined at the overflow opening 34 portion and then flow out of the overflow opening 34.

Figure 9:
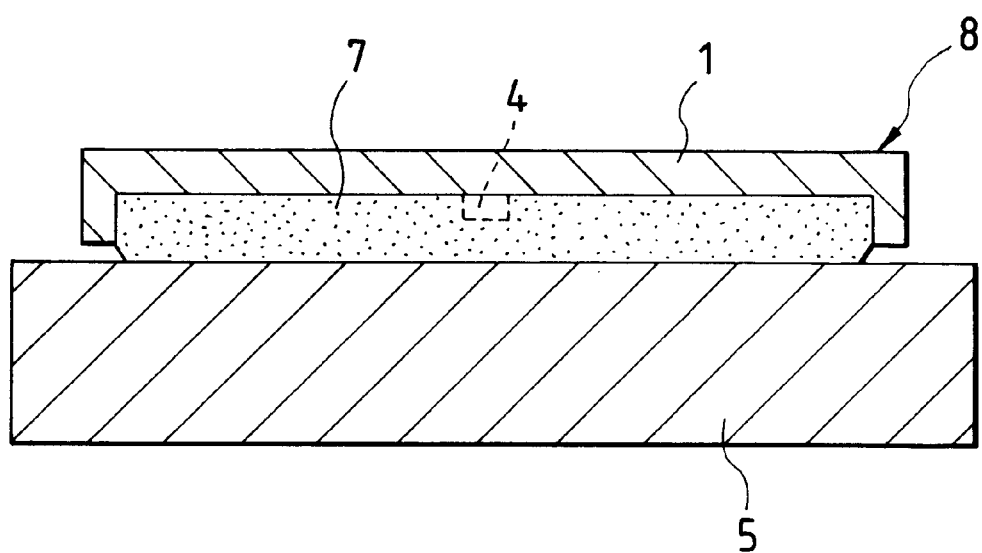
FIG. 9 is a sectional view showing a state where a molding body is brought into contact with a unit.
Figure 10:
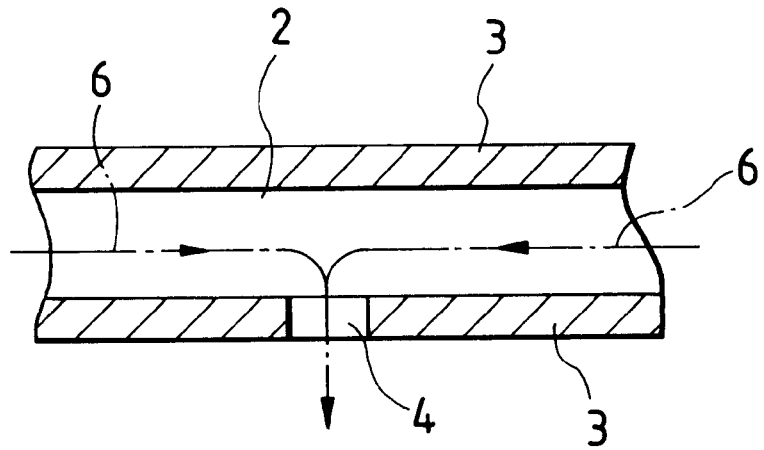
FIG. 10 is a sectional view of the conventional annular molding portion showing the flow of resin flowing therein.
Figure 11:
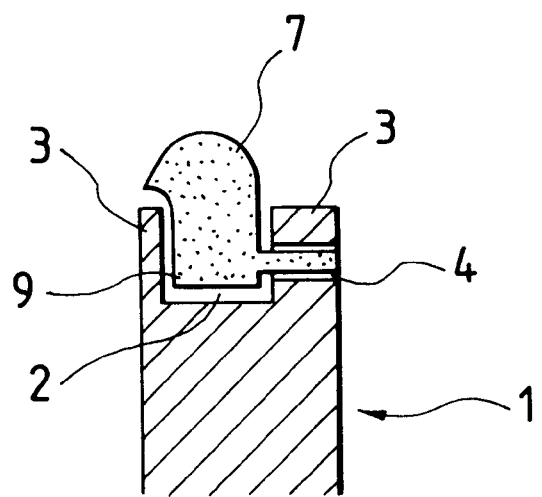
FIG. 11 is a sectional view of an elastomer formed by the conventional method.

Accordingly, shrinkage and welds are prevented from being generated at the elastomer 36 thus molded. Thus, the elastomer 36 can be prevented from being reduced in the intensity of its drawing tension and further the elastomer 36 can be prevented from being cut. Further, since the shrinkage and weld are prevented from being generated, as shown in FIG. 7, the elastomer 36 can be surely filled within the annular molding portion 31 and closely contact the erected wall portions 32. Therefore, the elastomer 36 is securely retained, and the elastomer can surely perform the sealing even when it is brought into contact with the unit 5 (see FIG. 9). Further, since a gas pocket is prevented from being generated, the fused resin 35 can flow within the annular molding portion 31 smoothly. As a result, it is not necessary to lower the overflow opening 34 so that it is flush with the bottom surface of the cylindrical portion 15 in order to prevent the generation of the gas pocket, and so the elastomer 36 can surely perform the sealing property.

In the aforesaid embodiment, the flowing distances of the two flow paths of the resin flowing toward left and right direction within the annular molding portion 31 are adjusted to be substantially the same. However, in the case where the flowing resistances of the two flow paths of the resin flowing toward left and right direction differ to each other, for example, when the flowing resistance of the flow path 31a is larger than that of the flow path 31b due to the fact that there is a narrow portion(s) or many bent portions at the flow path 31a or the flow path 31b is inclined downward rather than the flow path 31a, the flowing resistances of the two flow paths 31a and 31b can be made substantially same by making the length of the overflow opening 34 facing on the flow path 31a larger than the length thereof facing on the flow path 31b. As a result, it is possible to mold the elastomer without generating shrinkage or welds. Further, the resin supplied to the annular molding portion 31 may be resin other than an elastomer.

I claim:

1. A molding body comprising:
   a primary molding body;
   a secondary molding body formed integrally from the primary molding body; and
   an annular molding portion provided on said primary molding body for molding resin therein, said annular molding comprising:
      a gate opening for injecting the resin; and
      an overflow opening for ejecting excess resin, wherein two different flow paths fluidly connect said gate opening and said overflow opening, such that a first one of said flow paths is longer than a second one of said flow paths, and wherein said overflow opening is arranged in a manner that a length of said overflow opening facing said first flow path is greater than a length of said overflow opening facing said second flow path such that the flow paths are one of the same length and the same flow resistance.

2. In the molding body of claim 1, wherein said secondary molding body is made of an elastomer.

3. A method of fabricating a molding body, comprising the following steps:
   providing a primary mold body having an annular molding portion therein, said annular molding portion having a gate opening at one location and an overflow opening at another portion, and two flow paths defined therebetween, wherein a distance of a first one of said flow paths is greater than a distance of a second of said flow paths and said overflow opening is arranged in a manner that a length of said overflow opening facing said first flow path is greater than a length of said overflow opening facing said second flow path; and
   injecting resin into said gate opening, thereby causing the resin to flow in the two flow paths and to join at said overflow opening formed in said annular molding portion and overflow therefrom, such that a secondary molding body is integrally molded with said primary molding body.

4. The method of claim 3, wherein said resin is an elastomer.

5. A molding body comprising:
   a primary molding body;
   a secondary molding body formed integrally from the primary molding body; and
   an annular molding portion provided on said primary molding body for molding resin therein, said annular molding portion having a gate opening for injecting the resin and an overflow opening for ejecting excess resin, wherein two flow paths are defined between the gate opening and the overflow opening, and wherein the overflow opening is positioned to adjust the flow paths to one of the same length and the same flow resistance.

6. In the molding body of claim 5, wherein said secondary molding body is made of an elastomer.

7. A method of fabricating a molding body, comprising the following steps:
   providing a primary mold body having an annular molding portion therein, said annular portion having a gate opening at one location and an overflow opening at another portion and two different flow paths defined therebetween, wherein the flow paths are adjusted by the overflow opening such that the flow paths are one of the same length and the same flow resistance; and
   injecting resin into said gate opening, thereby causing the resin to overflow from said overflow opening formed in said annular molding portion such that a secondary molding body is integrally molded with said primary molding body.

8. The method of claim 7, wherein said resin is an elastomer.

* * * * *